June 28, 1938.  E. R. WHEELER ET AL  2,122,387
STOCK SELECTING AND INDICATING SYSTEM
Filed Jan. 20, 1930  8 Sheets-Sheet 1
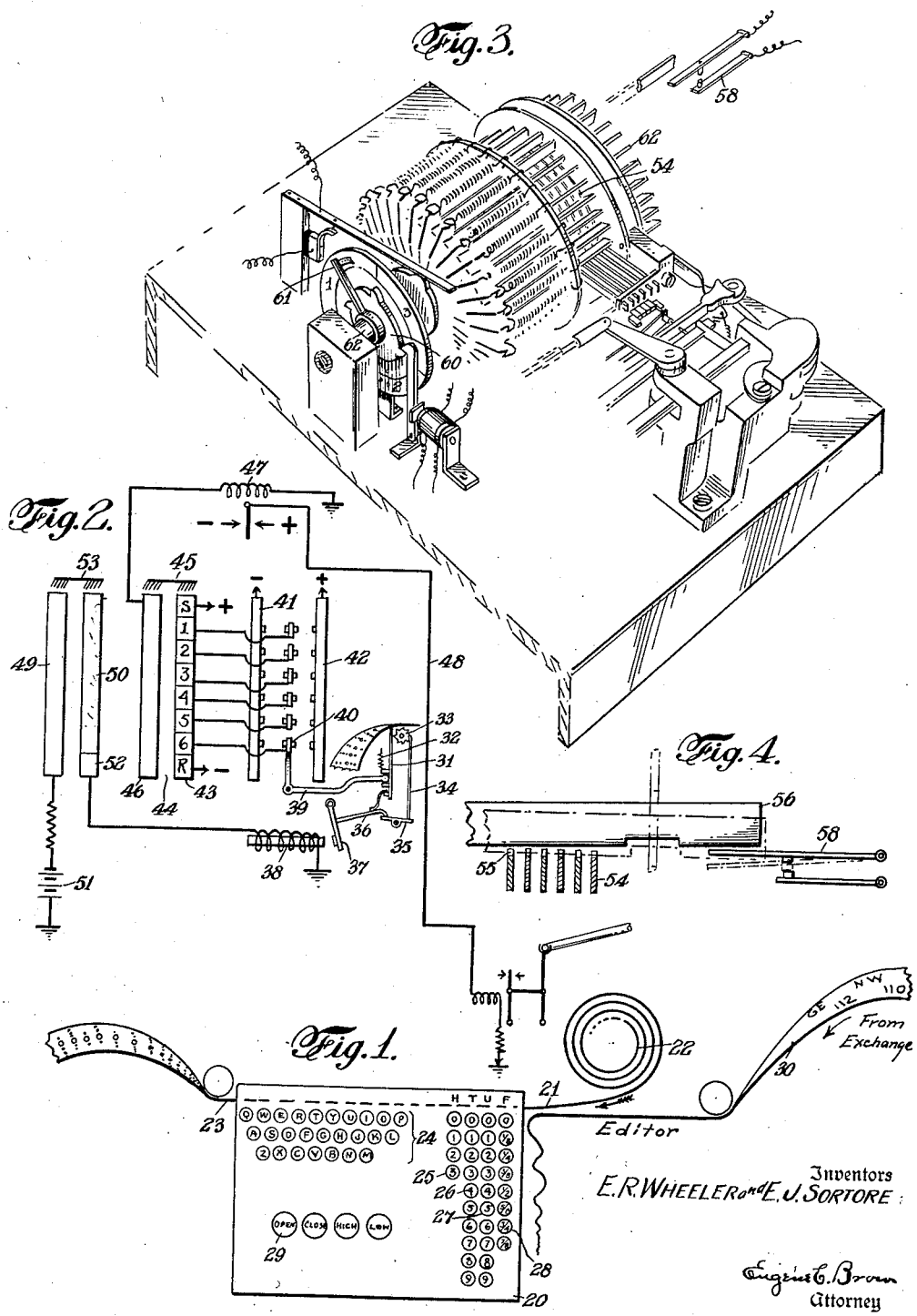
Inventors
E. R. WHEELER and E. J. SORTORE
Eugene C. Brown
Attorney June 28, 1938. E. R. WHEELER ET AL 2,122,387
STOCK SELECTING AND INDICATING SYSTEM
Filed Jan. 20, 1930    8 Sheets-Sheet 2

INVENTORS
E. R. WHEELER and E. J. SORTORE
BY
Eugene C. Brown
ATTORNEY

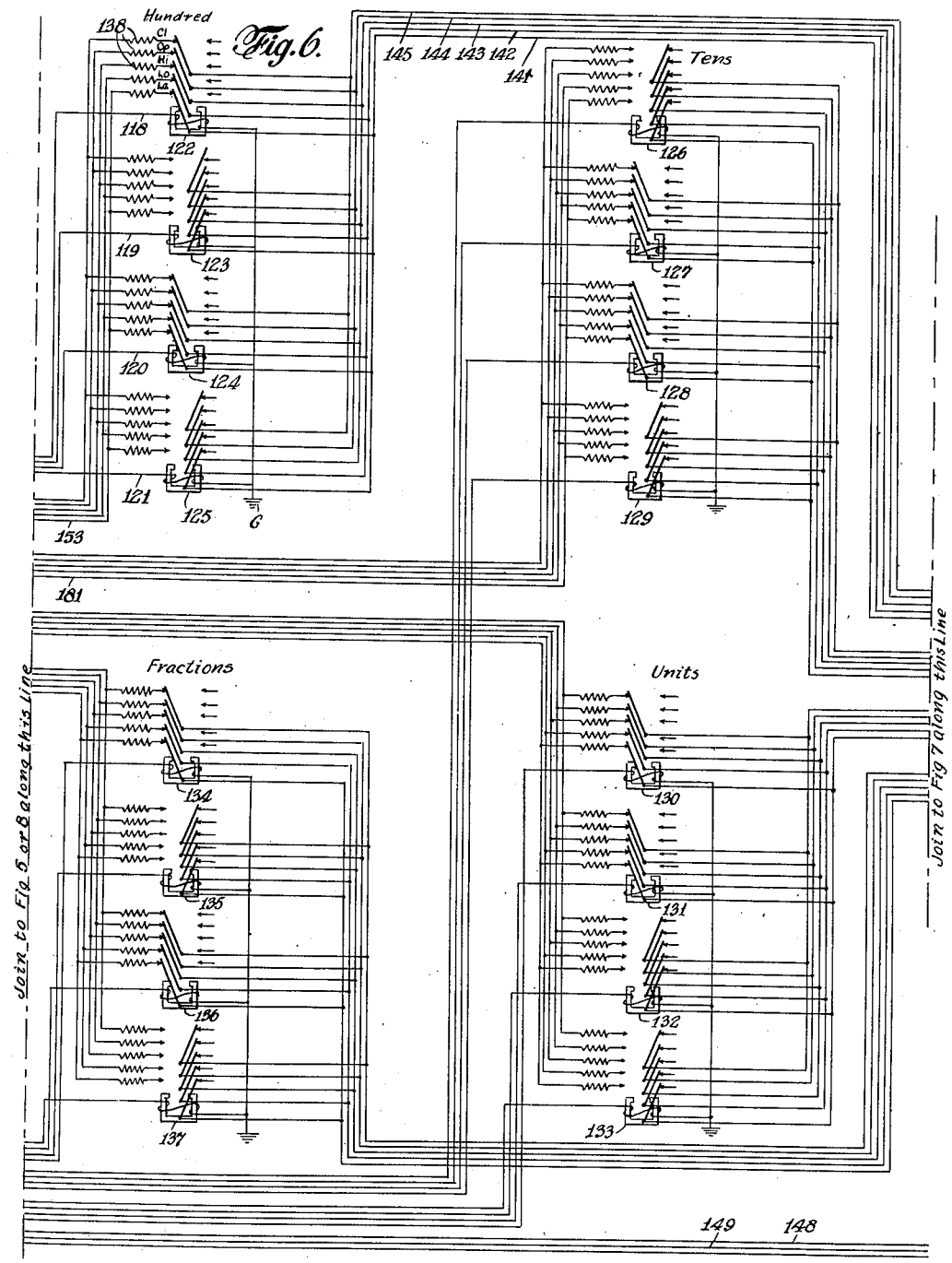

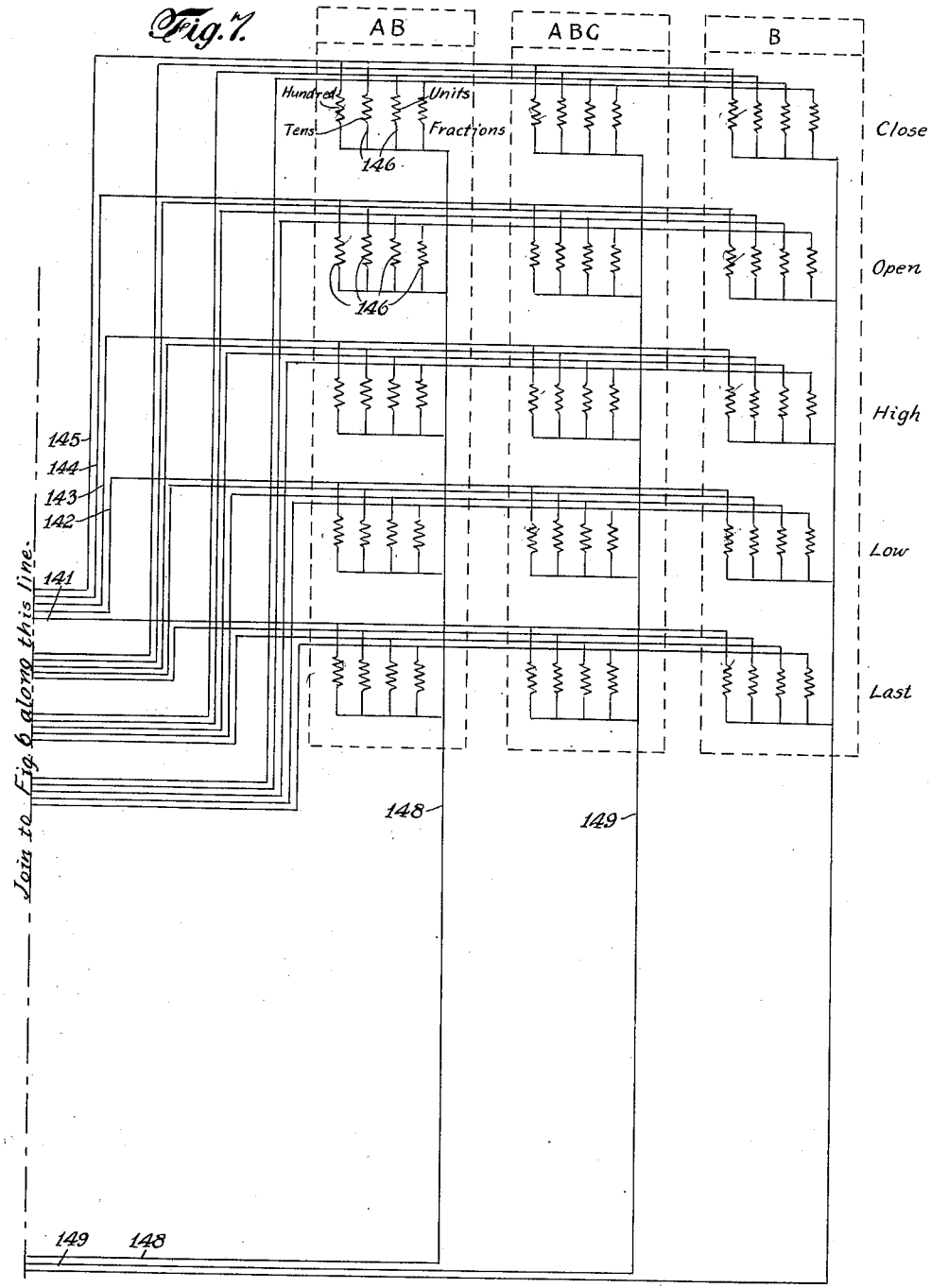

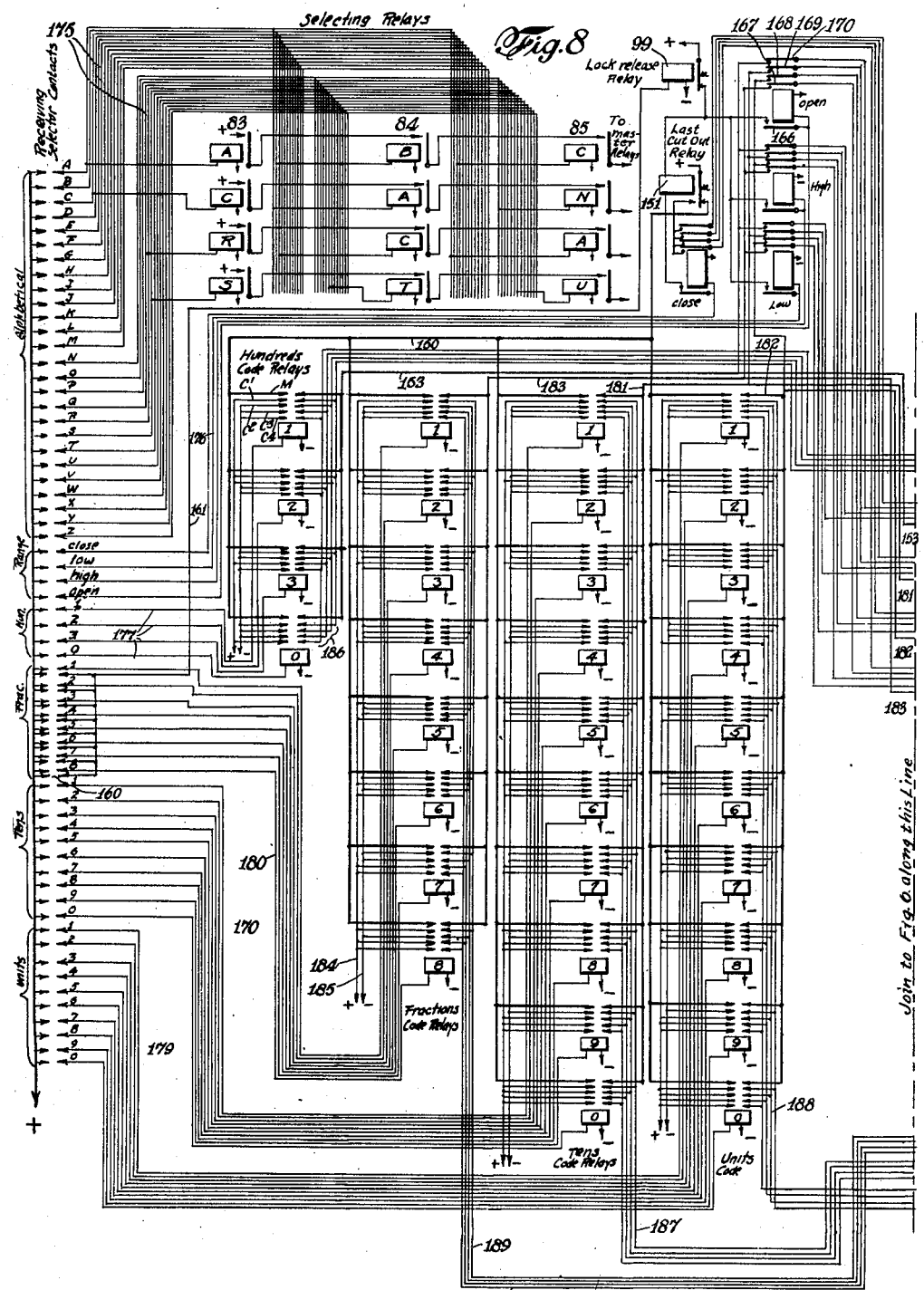

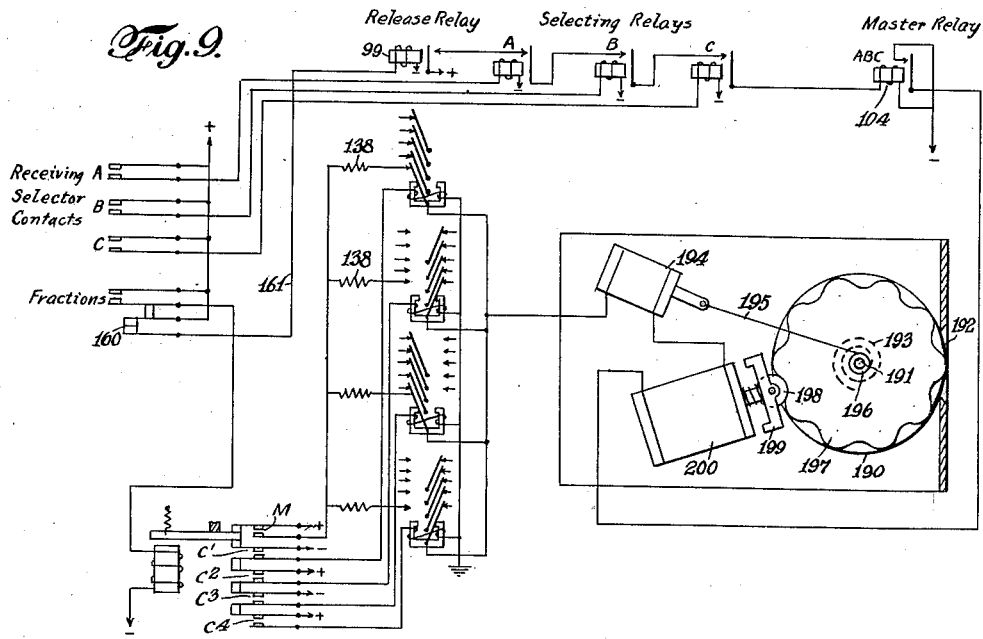

June 28, 1938.     E. R. WHEELER ET AL     2,122,387

STOCK SELECTING AND INDICATING SYSTEM

Filed Jan. 20, 1930     8 Sheets-Sheet 7

*Fig. 11.*

Letter and Range Code Combinations

|   |   |   |   |   |   |   |
|---|---|---|---|---|---|---|
| A | + | + | + | − | − | + |
| B | − | − | + | + | − | + |
| C | + | − | − | − | + | + |
| D | + | − | + | + | − | + |
| E | + | + | + | + | − | + |
| F | + | − | − | + | − | + |
| G | − | − | + | − | + | + |
| H | − | + | − | + | + | + |
| I | + | + | − | − | + | + |
| J | + | − | + | − | − | + |
| K | + | − | − | − | − | + |
| L | − | + | + | − | + | + |
| M | − | − | − | − | + | + |
| N | − | − | − | + | + | + |
| O | − | − | + | + | + | + |
| P | − | + | − | − | + | + |
| Q | − | + | − | − | − | + |
| R | + | − | + | − | + | + |
| S | + | + | − | − | + | + |
| T | − | + | + | + | − | + |
| U | + | + | − | − | − | + |
| V | − | − | − | − | + | + |
| W | − | + | + | − | − | + |
| X | − | − | − | + | − | + |
| Y | − | + | − | + | − | + |
| Z | − | + | + | + | − | + |
| Open | + | − | + | + | + | + |
| Close | + | + | + | − | + | + |
| High | + | + | − | + | + | + |
| Low | − | − | + | − | − | + |

*Fig. 12.*

Figure Code Combinations

|   |   |   |   |   |   |   |   |
|---|---|---|---|---|---|---|---|
| Hundreds | 0 | + | + | + | − | − | − |
|  | 1 | − | − | + | + | − | − |
|  | 2 | + | − | − | − | + | − |
|  | 3 | + | − | + | + | − | − |
| Tens | 0 | + | + | + | + | − | − |
|  | 1 | + | − | − | + | − | − |
|  | 2 | − | − | + | − | + | − |
|  | 3 | − | − | + | − | + | − |
|  | 4 | − | + | − | + | + | − |
|  | 5 | + | + | + | − | − | − |
|  | 6 | + | − | − | − | − | − |
|  | 7 | − | + | + | − | + | − |
|  | 8 | − | − | − | + | + | − |
|  | 9 | + | − | − | + | + | − |
| Units | 0 | − | − | + | + | + | − |
|  | 1 | − | + | − | − | + | − |
|  | 2 | − | + | − | − | − | − |
|  | 3 | + | − | + | − | + | − |
|  | 4 | + | + | − | + | − | − |
|  | 5 | − | + | + | + | + | − |
|  | 6 | + | + | − | − | − | − |
|  | 7 | − | − | − | − | + | − |
|  | 8 | − | + | + | − | − | − |
|  | 9 | − | − | − | + | + | − |
| Fractions | 0 | − | + | − | + | − | − |
|  | 1 | − | + | + | + | − | − |
|  | 2 | + | − | + | + | + | − |
|  | 3 | + | + | + | − | + | − |
|  | 4 | + | + | − | + | + | − |
|  | 5 | − | − | + | − | − | − |
|  | 6 | + | + | + | + | + | − |
|  | 7 | − | − | − | − | − | + |

*Fig. 13.*

| S T U | Open | 1 3 4 ⅝ | W 2 2 5 ⅞ | X | High | 2 0 4 ⅜ | 0 |

INVENTORS
E. R. WHEELER and E. J. SORTORE
BY Eugene C. Brown
ATTORNEY

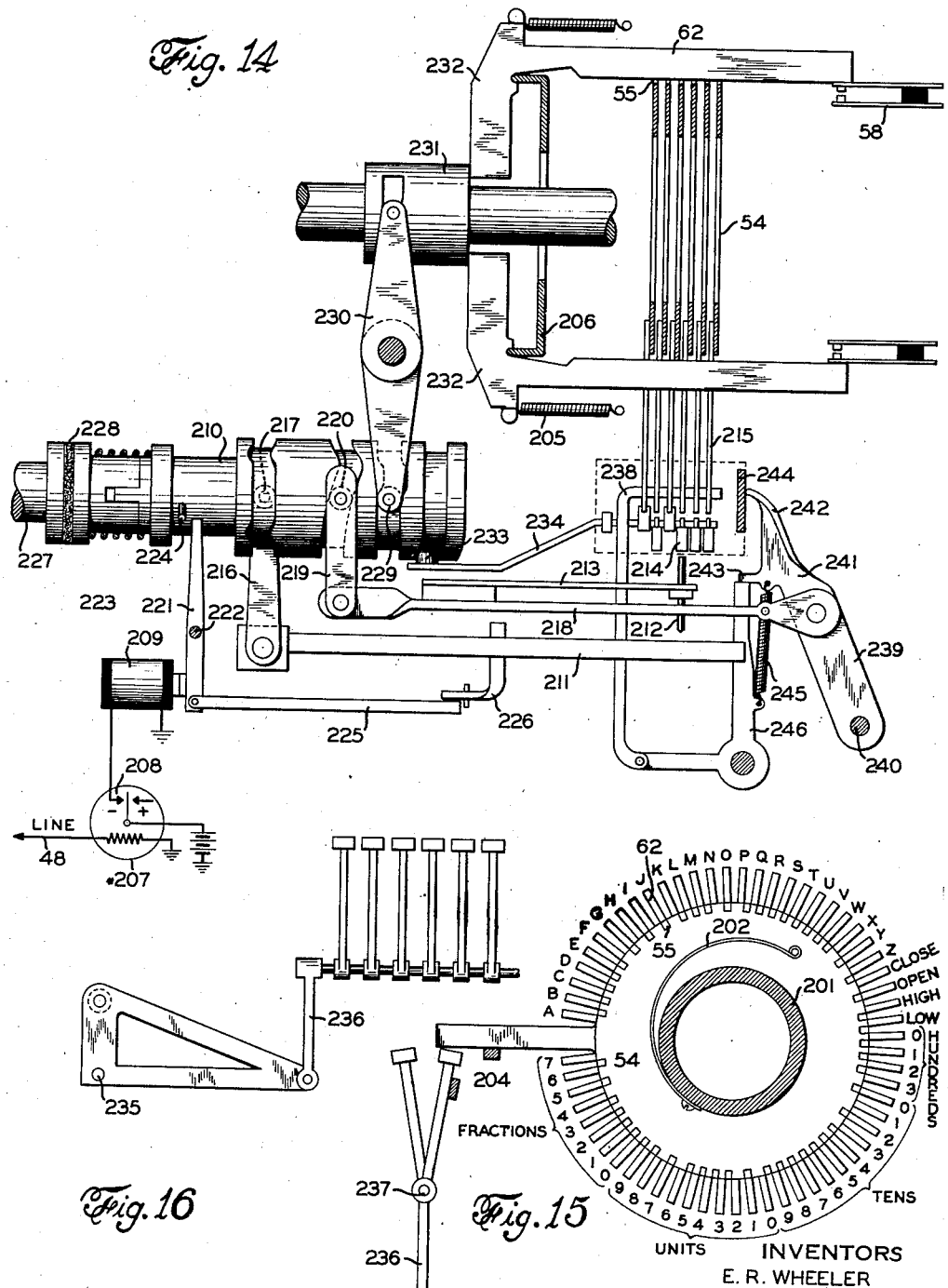

Patented June 28, 1938

2,122,387

UNITED STATES PATENT OFFICE 2,122,387

STOCK SELECTING AND INDICATING SYSTEM

Evan R. Wheeler, North Plainfield, and Emerson J. Sortore, Metuchen, N. J., assignors to The Western Union Telegraph Company, New York, N. Y., a corporation of New York Application January 20, 1930, Serial No. 422,148

12 Claims. (Cl. 177—353)

This invention relates to electric signaling and indicating means and more particularly to a method of and apparatus for operating selecting and indicating apparatus in response to electric signals transmitted over a single line wire, whereby information concerning a large number of different items may be visibly indicated at a plurality of distant stations.

While the invention is not limited thereto, it is particularly applicable to the posting of varying quotations or prices of a multitude of items, such as stocks, bonds and commodities, and the present description, by way of explaining the invention, will be restricted to an automatic stock quotation posting system.

The code signals corresponding to the desired quotations may be transmitted from a common point, such as a stock exchange and distributed to selecting and indicating apparatus located in brokers' offices, banks and similar places, whereby the quotations may be posted automatically and with a minimum of delay.

The information concerning each stock which it is generally desired to post upon the automatic quotation board is the "open", "high", "low" and "last" quotations of the day and the "closing" quotation of the preceding day. These quotations are termed the "range" and each of these quotations involves the use of four indicating units corresponding to the hundreds, tens, units and fractional values of the stocks. It is necessary, therefore, to provide on the indicating board five sets of indicators, each set having four indicator units and the apparatus must be capable of responding to the transmitted signals first to select the particular stock to be posted, second to select the particular range thereof to be posted and third to operate each of the indicator units of the selected range and stock to post a new price or quotation. This price or numerical value of the quotation is termed the "answer."

It has been proposed, heretofore, to control the operation of a stock quotation board to post the above information thereon, by transmitting groups of interspaced positive and negative impulses, usually three of such groups being transmitted over a single line and each group comprising a possible ten negative and ten positive impulses. The negative impulses constitute one control channel and the positive impulses constitute another control channel for effecting the stock and range selecting and indicator operating functions. Two such lines are required giving a total of four control channels. The first or selecting group of positive and negative impulses performs the stock and range selection at the quotation board. The second or restoration group serves to restore the selected indicators from their previous setting to a blank position and the third or answer group serves to reset the indicators to the new value of the quotation.

A rest period, equivalent to about five cycles of alternate positive and negative impulses is required after each group of signals to permit certain transfer operations to take place. Such a system, therefore, requires a time interval equivalent to about fifty-four distinct impulses over each line for the shortest signals transmitted and to about ninety distinct impulses for the longest signals. Considering both lines, double the number of impulses must be employed. Since the indicator units of this prior art system are operated by a step by step movement in response to each impulse of the restoration and answer groups, it is necessary to transmit the impulses at a sufficiently low rate of speed to permit the indicators to be properly stepped around. Such a system is disclosed in patent to Haselton et al. No. 1,890,878, granted December 13, 1932.

The stock selection, for the remote controlled quotation board systems heretofore proposed is obtained by giving each stock an arbitrary three digit number and transmitting over three of the control channels, impulses in the selecting group corresponding in number to each of the digits of the stock designating number. The number of stocks which can be handled by a single system employing two line wires is thus limited to 999 and since the listings on the New York Stock Exchange at the present time exceed this number, it is the practice to employ two distinct systems for each office, each system accommodating half of the listings on the exchange.

The use of the arbitrary number designations for the stocks also requires the conversion of the usual alphabetical abbreviations of the stock into the numerical designation. Due to the enormous number of different stocks listed, this conversion cannot be readily accomplished mentally by the transmitting operator and the automatic conversion mechanism devised for this purpose is involved and complicated.

It is one of the objects of the present invention to overcome some of the above difficulties and to produce a stock quotation board system requiring a relatively small number of impulses for effecting the stock selecting and indicator actuating operations.

Another object is to produce a system in which the alphabetical stock designations may be transmitted directly and the signals corresponding thereto employed at the receiving station for effecting the stock selection.

Another object is to increase the possible number of stock selections which can be accomplished with a single selecting system.

A still further object is to produce a transmitting and receiving system requiring but a single line wire, which will be rapid and dependable in operation.

A further object is to produce an automatic stock quotation posting system which is operable on signals of the Baudot code type.

A still further object is to provide a system in which the quotations may be recorded upon a perforated tape or other form of signal storage device and automatically transmitted to one or more receiving stations.

Another object is to provide a receiving system in which the transmitted signals are not employed directly to operate the stock selecting or indicating operating apparatus but to operate control circuits for effecting these operations.

Changes in succeeding quotations of a particular stock occur more often only in the fractions value or in the units and fractions value of stock, and in such cases it is not necessary to reset the remaining indicators. Also many of the stocks, particularly those having the greatest volume of sales and hence most often quoted, employ only one or two letter stock abbreviations or alphabetical designations. In the quotation systems heretofore employed, it has been necessary to transmit, in each instance, a stock selecting signal corresponding to each of at least three figure or letter stock designations, or to allot line time for such signals irrespective of the actual number of characters in the particular stock designation. It has also been necessary either to transmit a signal for each of the hundreds, tens, units and fractions indicators of the stock or to allot line time equal to such signals, regardless of whether or not it is desired to change the setting of the dials corresponding to each of the hundreds, tens, units or fractions digits of the quotation.

It is, therefore, another one of the objects of the present invention to increase the rate of transmission of the stock selecting and indicator operating signals by providing a system in which it is necessary to transmit stock selecting and indicator operating signals and to allot line time for signals corresponding only to the actual character of the alphabetical stock designation of the particular stock, and to the digit of the quotation in which the change occurs from the previous quotation.

Other objects and advantages will hereinafter appear.

In accordance with our invention we employ a single line wire for transmitting the information to be posted at the indicator boards. Several boards may be operated from a single line and through the use of the usual type of telegraph repeaters the signals may be repeated to any desired number of lines, each of which may serve to operate a number of quotation boards. The signals may be transmitted directly to the line by a keyboard transmitter or they may be recorded upon a perforated tape or other type of storage transmitter and be supplied thereby to as many outgoing lines as there are groups of quotation boards to be operated.

We employ a system of transmission utilizing a Baudot code or uniform impulse code composed of a uniform number of impulses of uniform length and intensity for each character, the impulses being arranged in different combinations of positive and negative polarity. The signals are composed of a sufficient number of impulses to give an individual code combination for each character to be transmitted or for each special function to be performed by the quotation system. Preferably, we employ a six unit code which provides a total of sixty-four separate character combinations which can be transmitted. Two of these combinations, namely, six negative and six positive impulses cannot be employed for the selection of characters, leaving sixty-two useful character combinations which may be allotted as follows:

26 letter character combinations,
4 code combinations for controlling the "yesterday's close", "open", "high" and "low" sets of indicators,
4 hundreds digit combinations,
10 tens digit combinations,
10 units digit combinations, and
8 fractions combinations.

With the allotting of the code combinations in this manner we are able to transmit a different character combination for each digit of the hundreds, each digit of the tens, each digit of the units and each digit of the fractional values of the quotation so that the digit 1 for instance, in the hundreds position, will have a different code combination from the digit 1 in the tens, units or fractions positions.

The character code combinations may be transmitted continuously, that is, without any intervening signals, or time allotment between each group of character selecting impulses, in accordance with the usual practice of multiplex telegraphy, or a start-stop system of transmission may be employed, in which case a start impulse is transmitted before each character code combination or before each of a group of character code combinations, and a stop impulse is transmitted following each character code combination or each of such groups of character code combinations.

The signal may be received by a rotary distributor either of the continuously rotating type operating in synchronism with the transmitted impulses, as through a tuning fork controlled motor or La Cour wheel, or a start-stop distributor may be used, depending upon the nature of the signals transmitted. The distributor may distribute the impulses to relays which effect the operation of the stock selecting and indicator operating apparatus.

Preferably, however, we employ at the receiving station a primary receiving selector of the permutation type similar to that employed in printing telegraph systems operated on the Baudot or uniform impulse code and for ease in maintaining the receiving apparatus in synchronism with the signals, we prefer to employ a start-stop system of transmission.

The "last" set of indicators is operated by every figure combination sent over the line except following a "yesterday's close" signal, in which case the "yesterday's close" indicators only are operated. The provision of a separate code combination for each of the "high" "low" and "open" sets of indicators enables one or more of these indicators to be operated simultaneously with the "last" indicators.

A certain amount of editing is required at the transmitting station in order to inform the keyboard transmitting operator whether or not any set of indicators other than the "last" should be operated in connection with each sale recorded. The keyboard operator transmits the quotations directly from the stock ticker tape and the editor may be situated alongside of the keyboard operator in a position to note on the tape, from observation of a small quotation board placed in front of him, whether or not the sale about to be transmitted is an opening quotation and whether it is above the previous "high" or under the previous "low" of the stock. The keyboard operator is thus advised to transmit either the "high", "low" or the "open" code combination prior to transmitting the figure code combinations.

The "close" may be sent to all boards after the termination of the regular market operations in readiness for the next day. As stated before, the "close" set of indicators are operated independently of the "last" indicators.

It will be understood that the keyboard transmitter or perforator, as the case may be, will have a separate key for each character combination or a total of 62 keys. The keys when depressed serve either to send out directly over a line or to perforate a tape in accordance with the six unit code, in the manner well understood in telegraphic transmission. The perforated tape, when used, passes from the perforator into a six contact tape transmitter which may be of the type described in patent to G. R. Benjamin #1,298,440, granted March 25, 1929, and entitled "Automatic transmitter".

The tape transmitter may be placed closely adjacent the perforator in order to eliminate delay in the transmission of the indicator selecting and indicator operating signals. The contacts of the tape transmitter set up the code combination in accordance with the perforations in the tape and supply the correct combination of positive and negative impulses to a rotary distributor by which they are transmitted to the various lines and thereby to the receiving mechanism of the quotation boards. The transmitting distributor, may be of the continuously operating type controlled by a phonic wheel or motor driven from a tuning fork or it may be driven by an ordinary electric motor with a start-stop device similar to start-stop distributors employed in simplex telegraph systems.

The signals transmitted to each receiving apparatus comprise a series of code combinations in the following order—a code combination for each letter of the alphabetical abbreviation of the stock, a code combination for the range, i. e., for the "high", "low", "open" or "close" sets of indicators when such indicators are to be operated and a code combination for the hundreds, tens, units and fractional values of the quotation in which changes occur from the previous quotation. The receiving apparatus must respond to these code combinations to (1) select the stock, (2) select the range and (3) to operate the indicators of the range and stock selected.

For this purpose we prefer to employ a primary receiving selector of the start-stop type, which responds to each of the code combinations to close one of sixty-two different control circuits associated with the board mechanism. These circuits control the stock selecting, range selecting and indicator operating mechanism.

Briefly, the primary receiving unit may comprise an arrangement of notched code disks, a separate disk being provided for each impulse of the unit code. The code disks are shifted in accordance with whether positive or negative impulses are received so as to assume for each code combination, one of a possible sixty-two different relative positions. In each position of the code disks there is a single set of notches in alignment. A group of sixty-two contact control bars are disposed on the surface of a cylinder around the code disks and are urged towards the notches therein by springs attached to each control bar so that in each position of the code disks one of the control bars is enabled to enter the aligned notches. The movement of the control bar into the aligned notches closes an electrical contact and thereby establishes one of sixty-two control circuits which extend from the primary selector to the selecting and indicating mechanism.

The start impulse operates a line magnet associated with the primary receiving selector to set a cam shaft into operation for shifting the code disks in accordance with the six succeeding impulses, constituting the character code combination. The stop impulse brings the cam shaft to rest in readiness for the next group of signal impulses.

The first function to be accomplished by the mechanism of the quotation board is to select from the several hundred individual stocks that are listed, the particular stock, the quotation of which it is desired to post, and to prepare a circuit for the indicator units thereof. For example, at the stock exchange or at the central transmitting point, quotations are transmitted as sales occur for each of the thousand or more stocks listed on the exchange. In any particular broker's office, a quotation board is provided with facilities for posting the quotations of only a limited number of stocks in which the broker or his customers are particularly interested. Such a board for instance, may provide for the posting of two hundred or more stocks. The stock selecting mechanism must be so constructed that it responds only to signals corresponding to stocks for which provision is made on the particular board and to select the particular set of indicators on the board which correspond to the stock, the quotation of which it is desired to post.

The primary receiving selector has twenty-six letter contacts corresponding to each letter of the alphabet. A three segment commutator having a rotating brush is associated with the receiving selector so that the brush will be stepped around over one segment for each letter code combination received. A master relay is provided for each stock appearing on the quotation board, the function of which is to complete the return circuit from the indicators selected, the master relay being controlled by one, two or three intermediate relays, depending upon the number of letters in the alphabetical abbreviation of the stock. For convenience we have termed the relays which respond to signals representing the first letters of the stock abbreviations, the primary selecting relays, those responding to signals representing the second letter of the stock abbreviation, the secondary selecting relays and the third group corresponding to the third letter of the stock abbreviation, the tertiary selecting relays.

The three segment commutator controls the distribution of the circuits closed through the contacts of the primary receiving selector, in response to the first, second or third letter combinations of the stock abbreviation, to the primary, secondary and tertiary groups of relays respectively.

The master relay closes an electrical path from the return of the magnets of each of the indicators of the stock selected, thus preparing a path to be completed by the figure code signals for operating the selected indicators. Therefore, since the stock selecting mechanism serves merely to complete the return circuit for the indicators it may be employed with any type of quotation board mechanism and is not limited to the form of board and board operating mechanism disclosed in the present application, nor is the specific arrangement of the quotation board mechanism of this application limited to the particular selecting mechanism disclosed, except in so far as each is operated in sequence by the circuits closed through the contacts of the primary receiving selector in response to the various letter or figure code combinations received over the same line.

The board mechanism is arranged so that the figure code combinations always operate the indicators representing the "last" quotation, except in the special case of figure signals following a "yesterday's close" signal in which case only the "yesterday's close" indicators are operated. The "high", "low" or "open" sets of indicators of the particular stock selected may be operated simultaneously with the last sets of indicators by transmitting the appropriate code combination following the letter combination and preceding the figure combination.

The indicator units disclosed in this application are of the type in which the extent of movement is dependent upon the magnitude of the current and each of the figure contacts of the receiving selector is connected to a separate coding relay, which through its contacts controls the magnitude of the current supplied to the indicator units by interposing different combinations of resistances in the indicator operating circuits.

Auxiliary contacts are provided at the receiving selector for operation with the fractions contacts, for restoring the previously completed selecting circuit to normal and for placing the range selecting mechanism in its normal unoperated position.

In order that the invention may be more fully understood reference will be had to the accompanying drawings in which:

Figure 1 illustrates the keyboard arrangement of the keyboard perforator;

Figure 2 is a diagrammatic illustration of the tape transmitter;

Figure 3 is a perspective view of the primary receiving selector;

Figure 4 is a fragmentary view of a contact control bar and one contact of the primary receiving selector;

Figure 6 is a circuit diagram showing the arrangement of the current controlling relays by which the variations in current supplied to the indicators is obtained;

Figure 7 is a circuit diagram showing the arrangement of the indicators at the board and the operating circuits therefor;

Figure 8 is a circuit diagram showing each of the circuits completed through the contacts of the receiving selector;

Figure 9 is a diagrammatic view of one of the indicators and the operating circuits therefor;

Figure 10 illustrates the arrangement of the indicators on the indicator board;

Figure 11 is a table showing the letter and range code combinations;

Figure 12 is a table showing the figure code combinations;

Figure 13 illustrates a portion of the perforated tape, perforated in accordance with a number of quotations;

Figure 14 is a diagrammatic illustration of the essential elements of the primary receiving selector;

Figure 15 is an elevational view of the code disks and the contact bars cooperating therewith; and Figure 16 is a fragmentary view showing the arrangement for operating the code disk selecting fingers.

Figure 5:
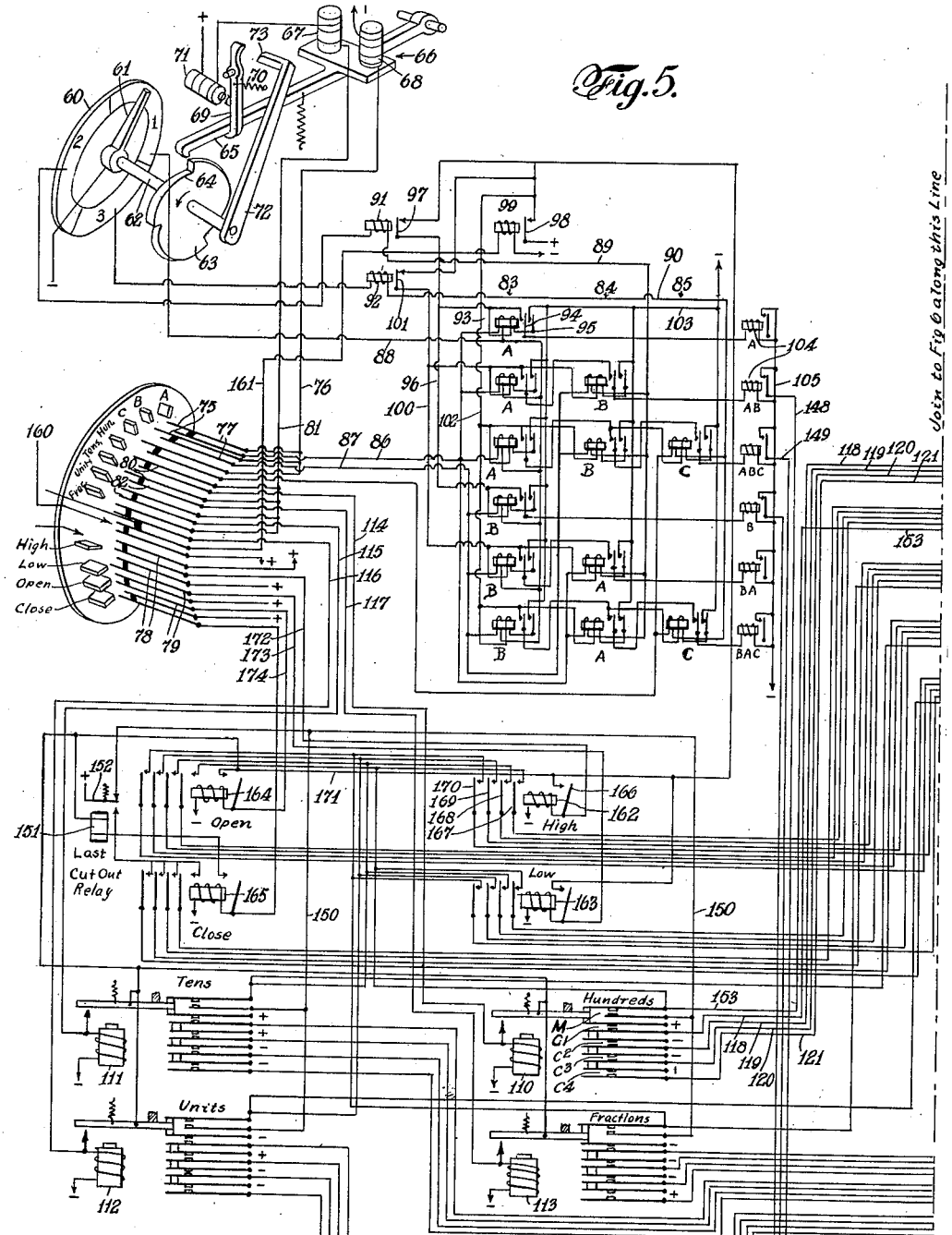
Figure 5 is a circuit diagram illustrating the stock selecting mechanism and the code relays for the indicators.

Referring first to Figure 1 we have shown a keyboard perforator 20, the imperforate tape 21 entering the perforator at one side from a reel 22 and emerging at the opposite side, as at 23, with transverse rows of perforations therein corresponding to predetermined signal combinations. The keyboard perforator has facilities for providing sixty-two distinct combinations of perforations of six units each and for this purpose is provided with fifty-eight character keys and four range keys. The fifty-eight character keys comprise twenty-six letter keys arranged in three horizontal rows 24, in a manner similar to the standard layout of the keys of a typewriter and thirty-two figure keys arranged in four vertical rows 25, 26, 27 and 28. There are four keys in row 25 corresponding to the 0, 1, 2 and 3 digits of the hundreds value of the stock. Ten keys are provided in each of the rows 26 and 27, corresponding to each of the tens and hundreds digits and eight keys are provided in row 28, corresponding to the fractional values, in eighths. Four range selecting keys are arranged in a horizontal row 29 and control code combinations for selecting the "open", "close", "high" and "low" sets of indicators at the quotation board. The ticker tape 30 passes from the ticker, not shown, to adjacent the perforator and the keyboard operator depresses the keys of the perforator in accordance with the information contained upon the ticker tape. The keys are depressed in the order of the letter keys corresponding to the alphabetical abbreviation of the stock, the range keys, when it is desired to post quotations other than the "last", and the figure keys, in the order of hundreds, tens, units, and fractions value of the quotation.

The construction of the tape perforating mechanism is well known in the telegraphic art and has not been shown in detail since it forms no part of the present invention. One form of tape perforator which may be employed is shown in Patent 1,182,179, Krum, granted May 9, 1916.

Briefly the perforating mechanism consists of a series of six selecting bars and a contact bar actuated by the depression of the keys. The selecting bars determine which of a series of six punches are to be operated and the contact bar controls the operation of a contact for energizing the punch magnet. The punch magnet operates a punch hammer to drive the selected punch through the paper tape. The paper tape is fed forward one space on the return movement of the punches.

In Figures 11 and 12 we have illustrated a possible arrangement of the impulses forming the six unit code for each of the letter signals, the range signals and the figure signals, and in Figure 13 we have shown a portion of a tape perforated in accordance with this code arrangement for a number of quotations. The large holes in the tape represent the marking or negative signals and the unperforated portion of each transverse row represents the spacing or positive signals.

The tape passes directly from the perforator into a tape transmitter which is shown diagrammatically in Figure 2. The tape transmitter comprises a series of six pins 31, one only of which is shown, corresponding to each of the perforations in a transverse row of the tape. The pins 31 are urged upwardly against the tape by springs 32. A star wheel provided with a ratchet wheel 33 is rotated by means of a pawl 34 through a rocking lever 35. A bifurcated arm 36 carried by the armature 37 of a magnet 38, has one end engaging the pin 31 and the other end engaging the rocking lever 35, in such manner that upon energization of the magnet 38 the bifurcated arm is moved downward, first to remove the pin 31 from the perforation in the tape and thereafter to rock the lever 35 and thus step the tape ahead to the next row of perforations.

Each of the pins 31 is connected by a lever 39 to a contact tongue 40 so as to operate one of a series of six such contact tongues which move between a negative or marking contact bar 41 and a positive or spacing contact bar 42. The tongues 40 are connected to corresponding segments of one ring 43 of a rotary distributor 44. The ring 43 is also provided with a start segment S connected to a positive source of potential and a rest or stop segment R, connected to a source of negative potential. A brush 45 bridges the ring 43 and a solid ring 46, the latter ring being connected to the winding of a polarized relay 47 by means of which the signals are repeated to an outgoing line 48. A second set of rings 49 and 50 is provided for the distributor for controlling the operation of the magnet 38. Ring 49 is solid and is connected to a grounded source of potential 51 and ring 50 has a single live segment 52 connected to one end of the winding of the magnet 38, the opposite end of the winding being grounded. The rings 49 and 50 are bridged by a brush 53, operating in unison with the brush 45.

The operation of the transmitter is as follows:—

Upon release of the magnet 38, the pins 31 move upwardly and either engage the underside of the tape or pass through one of the perforations therein. The pins which pass through the perforations in the tape move their corresponding contact arms against the marking or negative contact 41 and the pins which engage an unperforated portion of the tape hold their contact tongues on the spacing or positive contacts 42. As the brushes 45 and 53 pass over their contact rings, brush 45 first transmits a positive starting signal from the contact S, then a series of six character impulses of a definite combination of positive and negative impulses, depending upon the code combination set up through the tongues 40 of the transmitter. As the brush 35 passes on to the contact segment R, a negative or stop impulse is transmitted to the line and simultaneously therewith the brush 53 engages contact 52 to send an impulse through the magnet 38 which in turn operates the bifurcated arm 36 to withdraw the pins 31 from the perforations of the tape and to feed the tape forward for the next signal combination.

The start impulse serves to set into motion the receiving selector at the receiving station so that its selecting mechanism will operate in synchronism with the six character code impulses subsequently transmitted and the stop signal serves to arrest the motion of the receiving selector at the end of the selecting operation.

The general construction of the selecting mechanism of the receiving selector is well known in the art of printing telegrams and will not be explained in detail. It consists briefly of six selecting disks 54, one for each impulse of the code, each disk having sixty-two slots or notches 55 in its periphery and mounted so as to have a limited rotation about a central axis. The six character impulses received over the line actuate the receiving selector in such manner that one or more of the disks are rotated, in response to the marking signals, to set them up in a definite relation, depending upon the particular code signals received.

The notches 55 in each disk (see Figure 4) are so located with respect to each other that for every setting of the disk six of the notches or slots line up in a single position around the periphery of the disks. A series of sixty-two levers or contact control bars 56 are provided adjacent each of these positions, each lever representing one of the sixty-two letter, range or figure signal combinations to be selected.

For each combination of the disks there is one point in the peripheries of the disk at which there will be six slots in line, which will allow one of the contact control bars to move into the aligned slots and thus close one of a series of sixty-two switches 58 arranged under the contact control bars. Each contact 58 is closed only momentarily to enable the relays associated therewith to be actuated and locked up.

The construction of the receiving selector is fully described in patent of R. F. Dirkes and E. R. Wheeler, No. 1,916,166, granted June 27, 1933, and entitled Telegraph receiving apparatus.

The receiving selector shown in the present application differs from that described in the said copending application primarily in the use of additional stop or contact control bars and notches in the code disks, in the present case, to permit the sixty-two combinations to be utilized and in the provision of the switches 58 which are closed by the movement of the contact control bars. The rotating type wheel, which is included in said previous application may be employed, if desired, to give a record of the signals transmitted to the receiving selector.

The receiving selector has associated with it a three segment commutator 60 having segments 1, 2 and 3. The commutator is engaged by a rotary brush 61 mounted on a shaft 62 which may be driven through a friction clutch or other form of slip clutch from a continuously operating motor, not shown.

A stop wheel 63 (see Fig. 5) is rigidly mounted upon the shaft 62 and has three notches 64 adapted to be engaged by a stop arm 65, to hold the shaft against rotation. A magnet 66, having two windings 67 and 68 controls the operation of the stop arm to remove it from the notches 64, to permit the shaft to rotate a third of a turn and thereby to move the brush 61 over one segment of the commutator.

A latch 69 (see Figure 5) is normally held out of engagement with the stop arm 65 by a spring 70 and is adapted to be attracted by a magnet 71, when energized, to lock the stop arm 65 in its upper or release position, to permit the shaft 62 to rotate continuously. The winding of the magnet 71 is connected in series with the winding 67, of the magnet 66. A lever 72, rigid with the shaft 62, has an inturned end 73 which engages the latch 69, at the end of each revolution of the brush, to trip the latch and permit the stop arm to engage the stop wheel 63.

The commutator 60 controls the distribution of the letter signals to a group of stock selecting relays so that the signal corresponding to the first letter of the stock abbreviation will operate the primary selecting relay, the second letter signal will operate the secondary selecting relay and the third letter signal will operate the tertiary selecting relay.

The receiving selector is provided with twenty-six switches corresponding to the letter selections, thirty-two switches corresponding to the figure selections and four switches corresponding to the range selection. One contact 75, of each letter switch, is joined by a conductor 76 to the winding 68 of the commutator magnet 66 and thence to a source of positive potential. The opposite contact 77 of each of the letter switches is connected to the windings of the selecting relays, in a manner to be hereinafter described.

One contact 78 of each of the range switches is connected directly to a source of positive potential, the opposite contacts 79 being connected to the windings of the range selecting magnets, as will more fully appear hereafter. One contact 80 of each of the figure switches is connected by a conductor 81 through the winding 67 of the commutator magnet and the winding 71 of the latch magnet to a source of positive potential. The opposite contacts 82 of the figure switches are connected to the windings at a group of figure coding magnets.

The stock selection is accomplished through a series of relays corresponding in number to the number of letters in the alphabetical abbreviation of the stock. For instance, for a stock having the abbreviation ABC, three selecting relays would be provided. The relay corresponding to the first letter of the stock abbreviation, namely, the "A" relay in the present case, is the primary selecting relay, the relay corresponding to the second letter of the stock abbreviation or "B" relay, is the secondary selecting relay, and the relay corresponding to the third letter of the abbreviation or "C" relay, is the tertiary relay. The primary relays of all the stocks on a particular board are arranged in one vertical group 83 and as shown in Figure 5 comprises three "A" relays and three "B" relays. The secondary and tertiary selecting relays are similarly grouped at 84 and 85. For a stock the abbreviation of which comprises a single letter, as "A", but a single selecting relay is used, this relay being disposed in the primary group. The stocks having a two letter abbreviation require two selecting relays disposed in the primary and secondary groups.

One end of each of the operating or left hand windings of the "A" relays are connected by a conductor 86 to the contact 77 of the "A" switch at the receiving selector. Similarly the operating windings of the "B" relays are connected to the contact of the "B" switch by conductor 87 and so on for each letter of the alphabet. The opposite ends of the operating windings of each of the relays of the primary group 83 are connected by a conductor 88 to segment 1 of the commutator 60 and through the brush 61 thereof, to a source of negative potential. The return ends of the operating windings of the selecting relays of the secondary group 84 are connected by a conductor 89 to segment 2 of the commutator 60 and the return ends of the operating windings of the relays of the tertiary group 85 are connected by conductor 90 to segment 3 of the commutator. Conductor 89 has the winding of a primary release relay 91 in series therewith and conductor 90 has the winding of a secondary release relay 92 in series therewith.

Each of the selecting relays has two contact tongues 94 and 95, and corresponding front contacts. The locking or right hand winding of each of the relays 83, corresponding to a single letter stock abbreviation, is connected by a conductor 96 through the contact tongue 97 and back contact of primary release relay 91, and through the back contact and tongue 98 of lock release relay 99, to a source of positive potential. Similarly, the locking or right hand winding of each of the relays 84 corresponding to a two letter stock abbreviation is connected by a conductor 100 through the tongue 101 and back contact of the secondary release relay 92 and thence through the contacts of the lock release relay 99 to positive battery. The locking or right hand winding of the relays of the three letter stock abbreviations are connected by a conductor 102 directly to the back contact of the lock release relay 99.

The opposite or right hand terminal of the locking winding of each relay is connected to the tongue 95 of the same relay and the front contact of tongue 95 of each of the selecting relays is connected by a conductor 103 to a source of negative potential. The front contact of the tongue 94 of each of the primary selecting relays is also connected to the source of positive potential through the tongue of the lock release relays 91, 92 and 99. The tongues 94 of the primary relays, corresponding to a single letter abbreviation, are connected directly to one end of the winding of a master relay 104. There is one master relay provided for each stock. The tongue 94 of each of the primary relays corresponding to two and three letter abbreviations is connected to the front contact of tongue 94 of the secondary selecting relays and the tongue 94 of each of the secondary relays of the three letter abbreviations is connected to the front contact of tongue 94 of the corresponding tertiary selecting relay. The tongue 94 of each of the secondary selecting relays of stocks, having two letter abbreviations, is connected to the winding of the corresponding master relay 104 and the tongue 94 of each of the tertiary relays of three letter stock abbreviations is connected to its corresponding master relay.

The opposite ends of the windings of each of the master relays are connected through a conductor 105 to a source of negative potential.

The operation of the selecting relays is as follows: Assuming that the stock to be selected is designated by the abbreviation ABC. Three letter signal combinations representative of these letters are received by the receiving selector. Upon receipt of the "A" signal, the "A" switch of the selector is closed completing a circuit from the source of positive current through the winding 68 of the commutator magnet, thence through the "A" contact of the selector, to the operating windings of all of the "A" relays of the primary group, by conductor 88 to segment 1 of the commutator, on which the brush 61 normally rests and through the brush 61 to a source of negative potential. All of the "A" relays of the primary group will be energized and will complete their locking circuits through lock release relay 99. At the same time the magnet 66 will momentarily raise the stop arm 65 to permit the brush 61 to rotate on to segment 2 of the commutator. By the time the brush passes on to segment 2 of the commutator the "A" switch of the selector will have opened so that none of the relays of the secondary group will be operated.

The circuit to the master relay of the stock having a single letter abbreviation "A" will be completed at this time through the tongue 94 of the primary "A" relay.

Upon the receipt of the "B" signal, the "B" selecting switch will close and complete a circuit for the operating windings of all of the "B" relays of the secondary group, the return circuits for these windings being completed through the winding of the primary release relay 91 and segments 2 of the commutator. The primary release relay 91 is thus energized simultaneously with the locking up of the "B" relays of the secondary group. The relay 91 at this time opens its contacts and interrupts the locking circuit for all relays of the primary group corresponding to a stock having a single letter abbreviation. At this time it will be noted that the master relay 104 of the stock having the two letter abbreviation AB is operated through the tongues 94 of its selecting relays and the circuit to the master relay of the stock ABC is prepared through the "A" and "B" relays. The brush of the commutator is advanced at this time on to segment 3 in readiness for the last selecting signal.

Upon receipt of the "C" signal and consequent closing of the "C" switch of the selector, all of the "C" relays of the tertiary group are operated, their circuits being completed through the winding of the secondary release relay 92 and segment 3 of the commutator whereby all of the locking circuits of the relays corresponding to stocks having two letter abbreviations are opened. The selecting relays of the ABC stock, however, are locked up directly through the contacts of lock release relay 99 and a circuit is completed through each of the tongues 94 and their contacts to the master relay of the ABC stock.

In the case of a stock having a single letter abbreviation, the current to the master relay is completed through the contacts of the primary selecting relay and the primary release relay 91 as stated above, the locking circuit for this master relay being maintained since no further letter signals are transmitted. Likewise, in the case of a stock having a two letter abbreviation, the circuit to the master relay is completed through the contacts 94 of the primary and secondary selecting relays and the contacts of the secondary release relay 92, all of the relays corresponding to stocks having single letter abbreviations being released upon the operation of the secondary relay.

If it is desired to employ more than three letter stock abbreviations, the number of selecting relays may be increased accordingly, and an additional release relay and segment of the commutator provided for each additional letter included in the alphabetical abbreviation.

The front contact of each of the master relays is connected to the conductor 105 and thence to the negative source of potential, and the tongue of each of the master relays is connected to the return circuit for all of the indicators of the particular stock to which the master relay corresponds. These circuits will be subsequently traced.

After the stock selection has been completed and the selected master relay locked up, the figure signals are transmitted to operate the chosen indicators for the hundreds, tens, units and fractional values of the stock. For this purpose we employ a number of coding relays, one corresponding to each digit of each of the hundreds, tens, units and fractions values for which there are keys on the keyboard perforator. For instance, we employ four "hundreds" code relays, ten "tens" code relays, ten "units" code relays and eight "fractions" code relays. In Figure 5 we have shown only a single "hundreds", "tens", "units" and "fractions" code relay, indicated at 110, 111, 112 and 113 respectively and on the receiving selector we have shown a single "hundreds", "tens", "units" and "fractions" switch, indicated at Hun, Tens, Un and Frac respectively. The contacts 82 of each of these switches is joined by a conductor 114, 115, 116 and 117 respectively, to the windings of the relays 110, 111, 112 and 113.

Each of the coding relays has five spring contacts normally held open and adapted to be closed by the armature of the relay when the relay is energized. The contacts comprise a main contact M and four coding contacts $C_1$, $C_2$, $C_3$ and $C_4$. The coding contacts each have one terminal connected to either a negative or positive source or polarity in accordance with a predetermined plan as will appear more fully hereinafter, the opposite contacts being connected by conductors to the windings of four polarized current controlling relays which control the interpositioning of a greater or less amount of resistance in the indicator operating circuit, depending upon the polarity of the battery connected to each of the coding contacts. The "hundreds" coding contacts are connected by conductors 118, 119, 120 and 121 to the windings of polarized current controlling relays 122, 123, 124 and 125 and thence to ground G (see Figure 6).

The coding contacts of the "tens" coding relays are connected in a similar manner to four polarized current controlling relays 126, 127, 128 and 129 for controlling the current supplied to the "tens" indicators. The coding contacts of the "units" coding relays are connected to current controlling relays 130, 131, 132 and 133 for the "units" indicators and the coding contacts for the "fractions" coding relays are connected to the windings of current controlling relays 134, 135, 136 and 137 for controlling the current supplied to the "fractions" indicators.

The current controlling relays 122 to 137 each have five contacts $Cl$, $Op$, $Hi$, $Lo$ and $La$ corresponding to the "close", "open", "high", "low" and "last" sets of indicators and each contact has a resistance 138 connected thereto. Considering the "hundreds" current controlling relays 122 to 125, the resistance connected to each contact of a particular relay is equal but the resistance connected to the contacts of one relay differ from those of the others, in such ratio that by connecting the resistance in parallel in various combinations in a circuit, at least ten different current strengths may be obtained differing from each other by substantially equal amounts. The resistances for the tens, units and fractions current controlling relays are similarly arranged.

The contact tongues of the "hundreds" current controlling relays are connected by conductors 141, 142, 143, 144 and 145 to the "close", "open", "high", "low" and "last" hundreds indicators respectively of each stock on the quotation board. In a similar manner the tongues of the "tens", "units" and "fractions" current controlling relays are connected to the corresponding indicators in the "tens", "units", and "fractions" positions, at the indicator board.

Referring to Figure 7, we have shown, diagrammatically, a complete set of indicator units for three different stocks namely—stock AB, stock ABC and stock B. A group of four indicator units is provided for each stock, for each of the "close", "open", "high", "low" and "last" quotations. Each indicator unit may include one or more electromagnetic operating devices 146 by which the indicators are operated to a predetermined position in response to the magnitude of the current. The construction of one form of indicator which may be employed will be described in connection with Figure 9. The conductors 141 to 145, which extend from the tongues of the "hundreds" current controlling relays, are connected to one terminal of the electro-magnetic devices 146, of the "hundreds" indicators, for each range selection. In a similar manner the contact tongues of the "tens", "units", and "fractions" current controlling relays are connected to the windings of the operating units of the "tens", "units" and "fractions" indicators of each stock. The return circuit for the indicator units of stock AB comprises the conductor 148, which may be traced back through Figures 7, 6 and 5, to the tongue of the master relay of stock AB. Similarly the return circuit from the indicator units of stock ABC may be traced back through conductor 149 to the tongue of the master relay of the ABC stock and similarly the return circuits for the indicators of stock B is completed through the master relay corresponding to this stock.

Referring back to Figure 5 it will be recalled that the coding contacts $C_1$, $C_2$, $C_3$ and $C_4$ of the coding relays were connected to the windings of the polarized current controlling relays to set the current controlling relays in accordance with the code established through the coding relays.

The main contact M of each of the coding relays has one terminal connected by a conductor 150 to the back contact of a "last cut-out" relay 151 and through the contact tongue 152 thereof to a source of positive potential. The opposite terminal of the main contact of the hundreds code relay is connected by a conductor 153 through resistance 138 to the $La$ contact of each of the "hundreds" current controlling relays. Similarly the corresponding contact of the "tens", "units" and "fractions" code relays are connected through the resistance 138 to the $La$ contact of the "tens", "units" and "fractions" current controlling relays respectively.

The operation of the indicator actuating mechanism so far described is as follows:—Assuming that stock ABC has been selected and the master relay 104 thereof locked up as previously described and it is desired to operate the "last" set of indicators for this particular stock. Four figure code combinations will be transmitted to the receiving selector corresponding to the hundreds, tens, units and fractions values of the quotation. Upon receipt of the "hundreds" signal combination, a circuit is completed from the positive battery through the winding of the latch magnet 71, winding 67 of the commutator magnet, conductor 81 to the "hundreds" switch contact of the receiving selector corresponding to the hundreds digit of the quotation and thence by conductor 114 to the winding of the corresponding "hundreds" coding magnet 110 and to negative battery. The "hundreds" coding magnet 110 is thus operated to close its contacts, and hence establishing a circuit through the coding contacts $C_1$ to $C_4$ to the four "hundreds" current controlling relays to set up the tongues thereof either against or away from the contacts $Cl$, $Op$, $Hi$, $Lo$ and $La$ in accordance with the polarity of the battery supplied to each of the current controlling relays.

At the same time a circuit is also completed from positive battery through the tongue and back contact of the "last cut-out" relay 151, conductor 150, main contact M of the "hundreds" code relay and thence by conductor 153 to the resistance 138 and the $La$ contact of each of the "hundreds" current controlling relays, thence through the tongues of certain of these relays, (according to the setting thereof), and conductor 141 to the "last" hundreds indicators of each stock. The circuit for the last hundreds indicator is completed for stock ABC only, however through the return wire 149 and tongue of the master relay 104 of stock ABC and thence from the front contact of the master relay through conductor 105 to negative potential.

The "last" hundreds indicator of stock ABC is thus operated, the extent of operation depending upon the magnitude of the current supplied to it through the combination of resistances 138, chosen by the "hundreds" code relay.

In exactly the same manner the "tens", "units" and "fractions" code relays operate the "last" tens, units and fractions indicators.

The operation of each of the figure switches of the receiving selector operates the commutator to reset the brush upon segment 1. Thus, for instance, assuming signals corresponding to a single letter stock abbreviation to have been transmitted, the brush of the commutator would rest upon segment 2 at the time the first figure code combination was transmitted. The closing of the "hundreds" receiving selector switch, completes a circuit through the latch relay 71 and the winding 67 of the commutator magnet, thus operating both of these magnets. The latter magnet serves to raise the stop arm 65 from the stop wheel 63 and the former magnet through the latch 69, locks the stop arm in its raised position to permit the commutator shaft to rotate continuously until the brush comes opposite segment 1 at which time the release arm 72 engages the latch 69 to trip it and thus restores the stop arm 65 into contact with the wheel 63 and arrests the motion of the brush upon segment 1. The operation of the "tens", "units" and "fractions" receiving selecting switches will again release the stop arm and permit it to make one revolution. The commutator is therefore, reset at the end of the transmission of each quotation with the brush on segment 1 in readiness for the letter signals of the following stock selection.

After the operation of the "fractions" indicators it is necessary to restore the system to normal by releasing the master relay of the stock selected. This is accomplished by providing each of the "fractions" switches at the receiving selector with an auxiliary contact 160, disposed so as to be closed upon the closing of the main contact. The auxiliary contact 160 completes a circuit from positive battery through conductor 161 to the lock release relay 99 causing energization thereof and thereby breaking the locking circuit to the selecting relays of the ABC stock. The master relay for the ABC stock is thus released and interrupts the return circuit from the ABC set of indicators. The master relay is sufficiently slow-to-release, however to permit the fractions indicators to be set before the indicator return circuit is interrupted.

It will be noted that the reception of a set of figure code combinations automatically operates the "last" set of indicators without the necessity of any previous range signal. In order to enable the "high", "low", "open" and "close" indicators to be operated we provide four range selecting relays 162, 163, 164 and 165 corresponding respectively to the "high", "low", "open" and "close" indicators. The windings of these relays are connected to the correspondingly designated switches of the receiving selector so as to be operated in accordance with a definite range signal. Each range relay has five contact tongues 166, 167, 168, 169 and 170. The tongue 166 provides a locking circuit for the relay and is connected to one terminal of the relay winding. The front contacts of each of the tongues 166 is connected by a conductor 171 through the contacts of lock release relay 99, to a source of positive potential.

Referring first to the "high" range relay it will be noted that the tongue 167 thereof is connected to the Hi contact of each of the "hundreds" current controlling relays through the resistances 138. Contact tongues 168, 169 and 170 are similarly connected to the Hi contacts of the "tens" "units" and "fractions" current controlling relays respectively. In a like manner the tongues 167 to 170 of the "low", "open" and "close" range relays are connected to the Lo, Op and Cl contacts, respectively, of the "hundreds", "tens", "units" and "fractions" current controlling relays. The front contact of each tongue 167 of the "high", "low" and "open" range relays is connected, through the main contact M of the "hundreds" code relay to conductor 150 and thence through the back contact of the "last cut-out" relay 151 to positive battery. Similarly the tongues 168, 169 and 170 of the "high", "low" and "open" range relays are connected to the conductor 150 through the main contact of the "tens", "units" and "fractions" code relays, respectively. All of the front contacts of tongues 167 to 170 of the "close" range relay 165 are connected to the front contact of the "last cut-out" relay 151. The "last cut-out" relay 151 has its winding in series with the locking circuit of the "close" range relay.

The operation of the range selection is as follows. If, for instance, it is desired to operate either the "open", "high" or "low" indicators simultaneously with the "last" indicators, a range signal combination would be transmitted following the letter signals and preceding the figure signals. The range signals effect the closing of one of the range switches at the receiving selector and thereby completes the circuit from positive battery through one of the range receiving selector switches and conductor 172, 173 or 174, to the winding of either the "open", "high" or "low" range relay. Assuming the "high" range relay to be thus operated, its contact tongues pick up and in so doing complete a locking circuit through the contact tongue 166 and the contacts of the lock release relay 99. The contacts 167 to 170 at the same time prepare circuits from the main contact M of all of the "hundreds", "tens", "units" and "fractions" code relays to the Hi contact of the current controlling relays. Upon the operation of one of the "hundreds" code relays in response to the first figure signal, this circuit is completed through the main contact M of the chosen "hundreds" code relay and the tongues of the "hundreds" current controlling relays to the "high", hundreds indicator of the stock selected and upon the operation of the "tens", "units" and "fractions" code relays, to the corresponding "high" indicators of the particular stock selected.

At the same time, the circuits previously described for the "last" indicators of the stock selected, are completed directly through the main contacts M of the code relays and the La contacts of the current controlling relays.

The "yesterday's close" indicators are ordinarily set after the transaction of business on the stock exchange has closed for the day so that these indicators will be in readiness for the succeeding day's business. It is desired, therefore, to operate these indicators independently of the "last" indicators and it is for this purpose that we have provided the "last cut-out" relay 151.

Upon the reception of a "close" signal and the consequent operation of the "close" range relay 165, a locking circuit is completed for the "close" range relay through its tongue 166 and through the winding of the "last cut-out" relay 151. The tongue of the relay 151 moves to its front contact, thus removing the battery connection from the main contacts M of each of the code relays and applying it to the tongues 167 to 170 of the "close" range relay and thence directly to the Cl contacts of each of the current controlling relays. The succeeding figure signals serve to set the current controlling relays so as to interpose the correct resistances in the circuit to the "close" set of indicators at the quotation board.

In Figure 8 we have shown the switch contacts of the receiving selector developed together with all of the circuits directly controlled thereby. A group 175 of conductors extends from the alphabetical contacts A to Z to adjacent each group 83, 84 and 85 of selecting relays, so that the selecting relays may be connected thereto in any desired combinations. The locking and releasing circuits of the selecting relays have been omitted for simplicity of illustration and only the circuit completed through the contacts 94 of the selecting relays to the master relays are shown, the master relays themselves being omitted from the drawings. The range switches of the receiving selector are connected by a group of conductors 176 to the windings of the range selecting relays, the circuits completed through the contacts of the range relays being arranged as described in connection with Figure 5. The four "hundreds" selector contacts are connected by a group of wires 177 to the "hundreds" code relays for each of the digits 1, 2, 3, and 0. The "tens" selector contacts are connected by a group of wires 178 to the "tens" code relays, the "units" selector switches by a group of wires 179 to the "units" code relays and the "fractions" code relays. Each of the "fractions" selector switches has an auxiliary contact 160 connected by a conductor 161 to the winding of the lock release relay 99.

One terminal of the main contact M of each of the coding relays is connected by the conductor 150 to the front contact of the "last cut-out" relay 151 and the opposite terminals of contact M of the hundreds, tens, units and fractions coding relays are connected to the conductors 153, 181, 182 and 183 respectively which extend through the resistances 138 to the La contacts of the "hundreds", "tens", "units" and "fractions" current controlling relays respectively.

The coding contacts of each coding relay (Figure 8) have one terminal connected in different combinations to the conductors 184 and 185 for the application of battery of opposite polarities thereto, the opposite terminal of each of the coding contacts being connected by groups of conductors 186, 187, 188 and 189 to the windings of the "hundreds", "tens", "units" and "fractions" current controlling relays respectively.

The circuit diagram shown in Figure 8 has been arranged so that this figure may be matched up with Figure 6 to continue the circuits to the current controlling relays.

In Figure 9 we have illustrated one form of indicator unit which may be employed at the quotation board. The indicator comprises a drum 190 mounted upon a horizontal shaft 191 and having the numbers 1 to 9 and 0 thereon. The drum is mounted behind a window 192 in the indicator housing so that one figure of the drum only will be visible. A spiral spring 193 is disposed about the drum shaft and is connected to the drum and to the shaft so as to urge the drum around towards the zero position. The drum is operated in the opposite direction by a solenoid 194 having a flexible wire or cord 195 connected to its core and passing around a spindle drum or spool 196 mounted on the indicator drum, coaxial therewith. A detent wheel 197 having a series of ten depressions or notches around its periphery is also mounted on the side of the indicator drum. A detent 198 comprising a roller mounted on the armature 199 of a magnet 200 is located so as to engage in the notches of the detent wheel, to hold the indicator drum in a previously set position.

If a certain value of current, equivalent to one unit is passed through the winding of the solenoid 194 and the detent 198 is released, the solenoid will attract its plunger a certain distance and cause the indicator drum to rotate to position 1. If the current strength is increased by a single unit, the indicator drum will be rotated to position 2. In this manner by increases of current of different increments, the drum may be made to rotate to any desired position from 0 to 9. The spring 193 exerts a force directly proportional to the displacement of the drum and acts against the solenoid 194 to move the drum to a lower position upon a decrease in the solenoid current.

The current controlling relays of each of the hundreds, tens, units and fractions digits of the quotation control the magnitudes of the current supplied to a particular indicator unit.

The winding of the solenoid 194 has one end connected to one of the tongues such as the La tongue of the current controlling relays, its circuit being completed through the resistance 138 of the current controlling relay and the main contact M of one of the coding relays. The solenoid 194 and detent magnet 200 are connected in series, the return circuit of the winding of the detent magnet being completed through the contacts of the master relay 104.

Upon operation of the code relay, the current controlling relays are actuated as previously described to set up a particular combination of the resistances 138 in the circuit to the solenoid 194. Upon completion of the circuit, the detent 198 is removed from the detent wheel and the indicator drum is rotated to a position dependent upon the magnitude of the current supplied to the solenoid 194 through the resistances 138. Upon opening of this circuit, through the opening of the contact M of the code relay, the detent 198 is released to engage the detent wheel and thereby hold the indicator drum in its new position.

In Figure 10 we have shown one possible arrangement of the indicator units at the quotation board, each stock requiring twenty indicator units, such as shown in Figure 9.

Referring now to Figures 14, 15 and 16, a more detailed description will be given of the primary receiving selector. It comprises a series of code disks 54, corresponding in number to the number of units of the code. In the present instance six code disks are shown. Each code disk is mounted upon a cylinder 201, Figure 15, so as to have limited rotation around the same in one direction against the action of a spring 202 which tends to return the disk against a stop number 204. Each of the disks has a number of notches or slots 55 in its periphery. A group of contact control bars 62 are arranged around the periphery of the code disks and are biased towards the disks by springs 205. The contact control bars are pivoted around a pivot ring 206.

The code disks are set up in predetermined combinations by the code signals and in each relative position thereof a single set of notches 55 in each of the disks, come into alignment so as to present one of the contact control bars to move into such aligned notches. A pair of contacts 58 are located adjacent the end of each of the contact control bars so as to be closed thereby when the bars move into the notches of the disks.

The code character impulses are received over the main line 48 by a polarized relay 207. The tongue of the relay 207 is connected to a grounded source of potential and the marking contact 208 is connected to one end of the winding of a magnet 209, the opposite end of the magnet winding being grounded. Upon the reception of a marking or negative impulse over the main line, the magnet 209 will be energized and upon the reception of a spacing or positive impulse, magnet 209 will release its armature.

The code disks 54 are set up in accordance with the code combination transmitted over the line, by the selecting mechanism associated with a cam sleeve 210, having four cam grooves A, B, C and D.

Cam groove or track A serves to vibrate a striker bar or reed 211 causing it to strike a selecting pin 212 and force it inward against the tension of a flat spring 213, by which it is carried. Whenever the pin is moved inwardly it strikes one of six vertical selecting fingers 214 and pushes it under one of the extension arms 215 projecting from the code disks 54. The striker bar 211 is oscillated once for each of the six selection impulses, by the arm 216 which carries a roller 217 following in the cam groove or track A.

The selecting pin 212 is moved successively in front of the selecting fingers 214 by the traversing bar 218, which is shifted by a link 219, having a roller 220 following in the cam track B. This track or groove B is so shaped that it will cause the bar 218 to position the pin 212 in front of the first or left hand selection finger at the instant the first selecting impulse is received by the relay 207. The pitch or incline of the groove B is such that the pin 212 will be moved synchronously with the line impulses so that it will be successively opposite the proper finger at the time the corresponding impulse of the code is received. At the end of each code or character selection the bar 218 returns the pin 212 to its extreme left hand position during the interval of the rest and start impulses, so that it will be in a position opposite the first selection finger when the first selecting impulse is received.

As pointed out above, the cam track A causes the striker bar 211 to vibrate once for each of the six selecting impulses but in order that the code character may be set up on the code disks it is necessary that the selection fingers should be moved inwardly only when marking impulses are received while they should remain in non-selected position when spacing impulses are received. This distinction is effected by means of a rocker arm 221 which forms the armature of the magnet 209. The rocker arm is pivoted at 222 and has one end normally held by a spring 223 in the path of a stop pin 224 extending from the cam sleeve 210. The opposite end of the rocker arm is connected by a link 225 to a crank 226 extending under the striker bar 211 and which serves to raise the striker bar above the selecting pin 212 so that it will not engage the same when moved inwardly.

The cam sleeve 210 is connected to a continuously operating driving shaft 227 by a slip clutch 228.

Upon the receipt of a character code combination the first or start impulse is always of the marking variety and the magnet 209 is energized in response thereto, thus attracting the rocker arm 221 and removing the same from the path of the stop pin 224. Thereupon, the cam sleeve starts to rotate and at the same time the crank 226 is lowered from under the striker bar 211 to position the striker bar opposite the selecting pin 212.

If the next impulse, which is the first of the selecting impulses, is a marking impulse, the rocker arm 221 will remain in the same position and hence the striker bar 211 will remain opposite the selecting pin 212. The cam groove B will at this instant have positioned the pin 212 opposite the first selection finger 214 and the first notch in the cam groove A will cause the striker bar to strike the pin 212 and move the selection finger 214 under the projecting end of the first extension arm 215.

If the next selecting impulse is a spacing impulse, i. e., of positive polarity, the magnet 209 will release the rocker arm 221 and the link 225, upon movement to the right, will raise the striker bar 211 above the selecting pin 212. Accordingly when the cam groove A causes the striker bar to again move inwardly at the instant of the second impulse it will not engage the pin 212 and hence the selection finger 214 will remain in a non-selected position. In this manner the six selection fingers will be pushed inward or remain in outward non-selected position in accordance with the marking and spacing impulses of the code character.

Before the six selection fingers were positioned, the roller follower 229, carried by the lever 230, riding in the cam groove C caused the lever to slide the sleeve 231 to the right against the inner ends of the arms 232 of the entire annular set of contact control bars 62, thus rocking all the bars upon the pivot ring 206 and lifting the bar, which had been selected by the preceding code combination, from the slots or notches of the code disks and permitting the disks to be returned by their springs 202 to initial position.

Immediately following the positioning of the selection fingers and while the bars 62 are held away from the disks the follower roller 233 enters the offset in the cam groove D, thereby rocking the triangular lever 234 (Figure 16) on its pivot 235 and thereby lifting the link 236 carrying the rod 237 and the selection fingers 214. The fingers which were selected and pushed inwardly by the pin 212, now lift their associated extension arms 215 and rotate the disks 54 about the stationary supporting drum 201.

At the instant the disks have been shifted in accordance with the new code combination, the follower roller 229 passes an offset in cam groove C, thereby sliding the sleeve 231 to the left and permitting the contact control bars to be brought momentarily against the disks by their retractile springs 205. One bar, representing the character selected by the code combination, enters the aligned row of notches in the disks. The next instant the selection fingers 214 are all returned to their initial position by the return lever 238.

The operation of the return lever 238 is as follows: As the striker pin positioning bar 218 moves to the right across the six selecting fingers, the outer end of this bar moves the pivoted lever 239 about its pivot 240. A yoke shaped member 241 is pivoted to the outer end of the arm 239 and is provided with two arms 242 and 243. The arm 242 normally rests against an abutment 244, the other arm 243 being yieldingly held by a spring 245 against one end of a bell crank lever 246, to the offset end of which, the return bar 238 is pivoted. As the bar 218 approaches the end of its travel the yoke arm 243 slides from the end of the lever 246, thus permitting the spring 245 to swing the yoke on its pivot until the arm 243 engages the right hand side of the bar 246. When the bar 218 moves on its return stroke, towards the left, the yoke arm 243 pushes the lever arm 246, causing the return lever 238 to move forward and pull the selecting fingers 214 back to their initial position. The yoke arm 242 then strikes the abutment 244 and rocks the yoke on its pivot until the end 243 again slips over the top of the lever arm 246.

In cases where the change from the preceding quotation differs only in the fractions values, only a single figure combination corresponding to the new fractions value need be transmitted and where such changes occur for a stock having a single alphabetical abbreviation, it is necessary to transmit only two code signal combinations to the receiving selector. In the case of a complete change in the hundreds, tens, units and fractions values of a stock having a three letter abbreviation and if such quotation is an "open", "high" or "low" quotation, it is necessary to transmit eight code signal combinations. Since each signal combination involves eight impulses, counting the stop and start impulses, the minimum number of impulses which will effect a posting of a quotation is sixteen and the maximum is sixty-four. Most changes occur only in the fractions and units digits and the stocks having the greatest volume of sales are ordinarily designated by short abbreviations or letter designation so that the average number of impulses required for posting a quotation is relatively low. The transmitted impulses are employed only for operating the selecting switches and may be transmitted at a high rate of about seventy to eighty impulses per second. Hence with the maximum length quotation, considerably less than a second of line time is required and with the minimum signal, only about one fifth of a second, line time is required. The time required for transmitting an individual quotation is therefore short and the system is capable of high speed operation.

Where transactions occur at the stock exchange at a faster rate than a single operator is able to transmit the same, a number of perforators with individual operators may be employed and the tapes for each perforator used to transmit over a single line in the manner well known in multiplex telegraphy.

The use of a six unit code permits a separate code signal combination to be employed for each of the letter and range signals and for each figure in each position thereof, so that the quotation board may be operated with a minimum number of transmitted impulses and over a single line.

The number of code combinations available allow only four for the hundreds digit and permit the posting of stocks having quotations in which the hundreds digit does not exceed 3. There are relatively few stocks, the hundreds digit of which exceeds this figure and in such cases the hundreds digit may be posted by hand at the indicator board. In case the "high" and "low" is automatically posted at the board, as described in Patent No. 1,952,513 granted March 27, 1934, to Reynolds, and entitled "Quotation board indicating apparatus", code combinations corresponding to the "high" and "low" range are not employed and may be used for the hundreds digits 4 and 5.

However, if it is desired to post still further information such as the volume of sales, the number of units of the code may be increased to seven, thus giving one hundred and twenty-eight different code combinations, of which all but two are available for operating the switches of the selecting relays.

It is proposed in the near future to replace the present type of step-by-step stock ticker with a high speed permutation start-stop type of ticker operating on a Baudot code of six units in addition to the start and stop impulses, or in other words, on signals of the same general type and number of impulses as our above described quotation board system. It should be noted, therefore, that by modifying the ticker signals to provide a separate signal for each numeral in each digit position, our system may be operated directly from said ticker signals without an intermediate transmitting operator, means being provided where "high", "low" and "opening" quotations are to be posted to do so automatically from the operation of the "last" set of indicators, as described in said above mentioned application; it would also be necessary, of course, to provide means to prevent the false operation of the system by extraneous information transmitting over the tape ticker lines, such as volume of sales, news items and the like.

It is obvious that numerous changes may be made in the system and in the apparatus employed without departing from the invention and we contemplate all such changes as come within the spirit or terms of the appended claims.

For instance, it will be readily appreciated that in place of having the indicia on the indicator dials, for direct observation, the dials may be provided with type characters so as to serve as type wheels for printing the quotations on strips of paper, as shown for instance in patent to Wiley, No. 373,508, granted November 28, 1887, or as shown in patent to Gallagher, No. 752,059, granted February 16, 1904, and in the specification and claims, the term "indicator" is used to include either a direct reading dial or a printing dial or wheel for producing a printed record of the quotation.

What we claim is:

1. In a quotation system a set of digit indicators of the type adapted to be operated in response to the magnitude of the current supplied thereto, a plurality of current controlling relays associated with each indicator of the set, a single coding relay for each digit of each indicator to be indicated for controlling said relays and means for operating predetermined of said coding relays in response to code signals transmitted to said system.

2. In a quotation system, a plurality of indicators, each of which has a plurality of positions, a receiving selector having a contact individual to each position of each indicator of the plurality, a plurality of relays operated through said contacts, and means comprising circuits closed through the contacts of said relays for operating said indicators.

3. In a quotation system a set of indicators for each quotation to be posted, each indicator having a plurality of operated positions, a separated operating circuit for each of said indicators, a receiving permutation selector responsive to received permutation code signals and having a contact individual to each permutation received, and means actuated by the closing of a predetermined one of said contacts for selecting a particular indicator of the set and operating it over said circuit into one of a plurality of operated positions.

4. In a quotation system, an indicating unit comprising a dial having indicia thereon, means for operating said dial comprising an electromagnetic device responsive to variations in current strength to vary the setting of said dial and means for controlling the amount of current supplied to said electro-magnetic device, comprising a circuit for said device, a plurality of polarized relays, resistances associated with said relay contacts, and a single coding relay corresponding to each indicum of said dial for effecting the operation of said polarized relays, to introduce said resistances in definite combinations in said circuit.

5. In a quotation system, a plurality of groups of indicators at a receiving station, a selecting system for choosing a particular group of indicators, operating means for said chosen indicators and means controlled by signals of the permutation code type having a certain number of selecting conditions transmitted to said receiving station, for operating said selecting system, said last means being controlled by other signals having the same number of selecting conditions as said first mentioned signals but differently permuted therefrom, for operating said indicators into a predetermined one of a plurality of positions.

6. In a quotation system, a receiving station comprising a plurality of groups of indicators, each group representing a particular stock or other item to be posted, means for transmitting a varying number of permutation code item selection signals corresponding in number respectively to the number of characters designating the items to be posted, said means also transmitting indicator actuation signals immediately following said item selection signals, said receiving station having means responsive to said varying number of permutation code selection signals for selecting the said groups of indicators, and means responsive to said actuation signals for actuating the selected indicators to a new position.

7. A code signal system for operating a quotation board comprising a transmitting station, a receiving station, a line connecting said stations, a group of quotation indicators at the receiving station for each quotation, each group comprising separate indicators for the tens, units and fractions digits of a quotation, a transmitter at the transmitting station for sending over the line a series of code signals each consisting of a uniform number of electrical impulses, including a distinct code combination individual to each letter of the alphabet and a distinct code combination individual to each digit of the tens, units and fractions values of the quotation, means at the receiving station responsive to said received alphabetical code combinations to select a group of indicators for operation, and means to variably operate the indicators of the selected group in accordance with the received digit code combinations.

8. A code signal system for operating a quotation board comprising a transmitting station, a receiving station, a line connecting said stations, a group of quotation indicators at the receiving station for each quotation, each group comprising separate indicators for the tens, units and fractions digits of each of the open, close, high and low ranges of a quotation, a transmitter at the transmitting station for sending over the line a series of code signals each consisting of a uniform number of electrical impulses, including a distinct code combination individual to each letter of the alphabet and a distinct code combination individual to each digit of the tens, units and fractions values of the quotation, and a distinct code combination individual to each of the open, close, high and low ranges of the quotation, means at the receiving station responsive to said received alphabetical code combinations for selecting a group of indicators, and means responsive to said received range code combinations for selecting a predetermined set or sets of range indicators of said group and means to variably operate the indicators of the selected set or sets of indicators in accordance with the received digit code combinations.

9. In a quotation system, a group of indicators for each of a plurality of items, each group comprising a set of indicators corresponding to the "close" and "last" quotations of the items, means responsive to received code combinations for selecting a group of indicators for operation, means independent of the previous operation of the system for automatically operating the "last" set of indicators of the selected group in response to signals representing the numerical value of a quotation only, and means for selecting for operation the "close" indicators of the selected group independently of said "last" group of indicators in response to a predetermined signal transmitted prior to said signals representing the numerical values of the quotation.

10. In a quotation system, a plurality of indicators, a multi-contact selector responsive to received permutation code signals, a selecting mechanism for said indicators operated by said multi-contact selector, a release relay, means for completing a locking circuit for said selecting mechanism through the contacts of said release relay, means controlled by said multi-contact selector for operating said selected indicators and means operable upon the reception of the last code signal received by said multi-contact selector for operating said release relay to interrupt said locking circuit.

11. A quotation system comprising a receiving selector, contacts therefor corresponding to the fractions and to a plurality of higher digit values of the quotation, a group of indicators for each of a plurality of items, a selecting mechanism operated by said receiving selector for selecting a group of said indicators, a relay, a locking circuit for said selecting mechanism completed through the contacts of said relay for maintaining the selection of the selected group of indicators, and means for operating said relay to interrupt said locking circuit to release the selection of the selected group of indicators upon operation of the fractions contact of the receiving selector.

12. In a quotation system, a group of indicators for each of a plurality of items, each group comprising a plurality of sets of indicators, means responsive to received code combinations for selecting a group of indicators for operation, means independent of the previous operation of the system responsive to signals corresponding to the numerical values of a quotation only for automatically operating one of said sets of indicators of the selected group and means responsive to a predetermined signal preceding said numerical signals for rendering said set of indicators non-responsive and rendering a second set of indicators of the selected group responsive to said numerical signals.

EVAN R. WHEELER.
EMERSON J. SORTORE.